(12) United States Patent
Yamaguchi

(10) Patent No.: US 7,987,610 B2
(45) Date of Patent: Aug. 2, 2011

(54) METHOD OF EXAMINING APERTURE DIAMETER OF DISK SUBSTRATE HAVING CIRCULAR APERTURE IN CENTRAL PORTION THEREOF AND APPARATUS THEREOF

(75) Inventor: Katsunobu Yamaguchi, Yachiyo (JP)

(73) Assignee: Showa Denko K.K., Tokyo (JP)

( * ) Notice: Subject to any disclaimer, the term of this patent is extended or adjusted under 35 U.S.C. 154(b) by 571 days.

(21) Appl. No.: 12/055,124

(22) Filed: Mar. 25, 2008

(65) Prior Publication Data

US 2008/0239538 A1   Oct. 2, 2008

(30) Foreign Application Priority Data

Mar. 27, 2007   (JP) ................................ 2007-082170

(51) Int. Cl.
  *G01B 5/12* (2006.01)
(52) U.S. Cl. ........................................................ 33/542
(58) Field of Classification Search .................... 33/542; 73/865.8
  See application file for complete search history.

(56) References Cited

U.S. PATENT DOCUMENTS

| | | | | | |
|---|---|---|---|---|---|
| 1,225,314 | A | * | 5/1917 | Conrad | 33/542 X |
| 2,826,819 | A | * | 3/1958 | Esken | 33/542 X |
| 3,581,881 | A | * | 6/1971 | Hobbs, II | 206/315.9 |
| 5,351,410 | A | * | 10/1994 | Hainneville | 33/542 |
| 6,050,127 | A | * | 4/2000 | Rao et al. | 73/12.13 |
| 6,280,294 | B1 | * | 8/2001 | Miyamoto | 451/34 |
| 7,013,713 | B2 | * | 3/2006 | Webster et al. | 73/53.06 |

FOREIGN PATENT DOCUMENTS

| | | | | | |
|---|---|---|---|---|---|
| JP | 52154986 | A | * | 12/1977 | |
| JP | 57028201 | A | * | 2/1982 | 33/542 |
| JP | 59073716 | A | * | 4/1984 | 33/542 |
| JP | 61167809 | A | * | 7/1986 | 33/542 |
| JP | 63282601 | A | * | 11/1988 | 33/542 |
| JP | 03063501 | A | * | 3/1991 | 33/555.1 |
| JP | 07-198303 | A | | 8/1995 | |
| JP | 07328190 | A | * | 12/1995 | |
| JP | 11-033886 | A | | 2/1999 | |
| JP | 11-221742 | A | | 8/1999 | |

* cited by examiner

*Primary Examiner* — Thomas P Noland

(74) *Attorney, Agent, or Firm* — Sughrue Mion, PLLC

(57) ABSTRACT

The present invention relates to a method of examining an aperture diameter of a disk substrate having a circular aperture in the central portion thereof, the method including: attempting to pass a standard sphere for the aperture diameter through the aperture; and inspecting the aperture diameter of the disk substrate, based on whether the sphere passes through the aperture or not. Furthermore, the present invention relates to an examination apparatus thereof.

5 Claims, 3 Drawing Sheets

METHOD OF EXAMINING APERTURE DIAMETER OF DISK SUBSTRATE HAVING CIRCULAR APERTURE IN CENTRAL PORTION THEREOF AND APPARATUS THEREOF

FIELD OF THE INVENTION

The present invention relates to a method of examining the aperture diameter of a disk substrate having a circular aperture in the central portion thereof, and an apparatus thereof. In particular, the present invention relates to an examination method which is suitable for examining the aperture diameter of a glass substrate for a magnetic recording medium that is used in a hard disk apparatus, and an examination apparatus thereof.

This application claims the priority benefit of Japanese Patent Application No. 2007-082170, filed Mar. 27, 2007, the contents of which are incorporated herein by reference.

BACKGROUND OF THE INVENTION

In recent years, production of disk substrates has increased due to an upturn in the demand for its use as a recording device in a hard disk apparatus. In general, a hard disk apparatus includes a shaft that concentrically rotates one or a plurality of disk-like (i.e. doughnut-like shaped) magnetic recording media having a circular aperture in the central portion (that synchronously rotates if the plurality of media are equipped therein); a motor that rotates at a high speed the magnetic recording media connected to the shaft via bearings; a magnetic head that is utilized for recording and/or recalling the data on the both sides of the magnetic recording medium; a supportive arm that is equipped with the magnetic head; and a head stack assembly that synchronously actuates a plurality of supportive arms whereby the magnetic heads can be moved to any position on the magnetic recording media. In addition, such a magnetic head used for magnetic recording and recalling the data is generally a flying-type head where the head moves over the magnetic recording medium at a predetermined height.

Such a magnetic recording medium is produced by way of forming a magnetic layer, a protective layer, a lubricant layer and the like on the surface of the disk substrate having a circular aperture in the central portion. Aluminum or glass substrates are widely used as the disk substrates. Aluminum substrates have advantages in that the processability is high, and that they are cheap. On the other hand, glass substrates have an advantage in that they have excellent strength, and smoothness or flatness of the surface. In particular, miniaturization and densification of disk substrates have been urgently sought in recent years, and glass substrates that have a smaller surface roughness and that enable densification have attracted all the attention.

As a technique that relates to production of such glass substrates for magnetic recording media, a technique of polishing the inner circumference of a glass substrate having a center aperture has been conventionally proposed (for example, see Japanese Unexamined Patent Application, Publication Nos. H11-33886 and H11-221742). These patent documents describe a technique in which a plurality of glass substrates are layered, and then, they are rotated on the axis, and a polishing brush which rotates to the opposite direction of the glass substrates is inserted into the center apertures while the polishing brush is also moved back and forth in the axial direction whereby the inner circumference of each glass substrate can be polished.

The above-described glass substrate for the magnetic recording medium is attached to a motor shaft inside the hard disk apparatus. If its aperture diameter is even slightly smaller than the diameter of the shaft, it is impossible to connect the magnetic recording medium thereto. On the other hand, if its aperture diameter is lager than the diameter of the shaft, then, the magnetic recording medium is connected eccentrically to the shaft, and this causes malfunctional fluctuation thereof when the magnetic recording medium rotates at a high speed. Therefore, a high level of accuracy is required in processing the aperture diameter of glass substrates for magnetic recording media.

Furthermore, as methods of examining the aperture diameter of a disk substrate having a circular aperture in the central portion thereof, (1) a method wherein the diameter of the aperture is analyzed by way of image analysis based on the picture of the aperture taken with a CCD camera; (2) a method wherein an aperture diameter is measured with an inside diameter-inspecting apparatus using two or more stylus probes (for example, see Japanese Unexamined Patent Application, Publication No. H7-198303); and (3) a method wherein the diameter is measured by way of inserting a plug gage into the aperture have been used conventionally.

However, the above-mentioned method (1) has disadvantages in which the measurement takes a long time, and that the aperture diameter is measured erroneously as smaller than the actual size if the substrate inclines even slightly. The above-mentioned method (2) also has disadvantages in which the measurement accuracy thereof is inferior, the measurement takes a long time, and scratches may be present on the substrate where the stylus probes touch. The above-mentioned method (3) is not suitable for the process control since the measurement takes a long time, and it is difficult to quantify the inspected results. Moreover, the method (3) has a disadvantage in which it is likely to cause scratches on the inspected substrate. In particular, the methods (2) and (3) require a long time for the measurement, and therefore, it is difficult for the method to measure all numbers of disk substrates.

SUMMARY OF THE INVENTION

The present invention was achieved in order to solve the above-described technical problems. The object of the present invention is, to provide an examination method wherein all numbers of disk substrates having a circular aperture in the central portion thereof can be easily inspected in a short time with respect to the aperture diameter thereof by following concise procedures, and it is unlikely for the substrates to have scratches or the like thereon and also, to provide an examination apparatus thereof.

The present inventors conducted extensive studies to solve the above-described technical problems. Consequently, they discovered that the examination can be easily achieved without damaging the substrates by evaluating whether a standard sphere for the aperture diameter can pass through the aperture in examining the aperture diameter of the disk substrates having a circular aperture in the central portion thereof, and this resulted in the present invention.

That is, the present invention relates to the following aspects.

(1) A method of examining an aperture diameter of a disk substrate having a circular aperture in the central portion thereof, the method including: attempting to pass a standard sphere for the aperture diameter through the aperture; and inspecting the aperture diameter of the disk substrate, based on whether the sphere passes through the aperture or not.

(2) The method of examining an aperture diameter of a disk substrate having a circular aperture in the central portion thereof according to (1), wherein, in a state that a plurality of the disk substrates is arranged where the main surfaces of the disk substrates are spaced out parallel to each other and where the center axes of the disk substrates are the same, the attempt is made to pass the sphere from the aperture of the disk substrate at one side to the aperture of the disk substrate at the other side; and, while removing the disk substrate that the sphere cannot pass through, a plurality of the disk substrates is successively inspected with respect to the aperture diameter.

(3) The method of examining an aperture diameter of a disk substrate having a circular aperture in the central portion thereof according to (2), wherein the disk substrates are moved back and forth in the direction parallel to the main surface of the disk substrate to conduct the movement of the sphere through the aperture of the disk substrate.

(4) The method of examining an aperture diameter of a disk substrate having a circular aperture in the central portion thereof according to (3), wherein the disk substrates are disposed in a substrate-storage container which an upper cover and a lower cover are taken out from, and the disk substrates are moved back and forth in the direction parallel to the main surface of the disk substrate while the disk substrates are not taken out completely from the substrate-storage container.

(5) The method of examining an aperture diameter of a disk substrate having a circular aperture in the central portion thereof according to any one of (1) to (4), wherein the disk substrate is a substrate for a magnetic recording medium.

(6) The method of examining an aperture diameter of a disk substrate having a circular aperture in the central portion thereof according to any one of (1) to (5), wherein the disk substrate is a glass substrate.

(7) An apparatus for examining an aperture diameter of a disk substrate having a circular aperture in the central portion thereof, the apparatus including: a guide in which a plurality of disk substrates is arranged where the main surfaces of the disk substrates are spaced out parallel to each other and where the center axes of the disk substrates are the same; a system that successively moves the plurality of the disk substrate, which is arranged in the guide, back and forth in the direction parallel to the main surface of the disk substrate from one side to the other side in the arranged direction; a system that attempts to pass a standard sphere from the aperture of the disk substrate at one side, to the aperture of the disk substrate at the other side in the arranged direction, and that detects the disk substrate which the sphere cannot pass through; and a system that removes from the guide the disk substrate which the sphere cannot pass through.

(8) The apparatus for examining an aperture diameter of a disk substrate having a circular aperture in the central portion thereof according to (7), wherein a substrate-storage container which an upper cover and a lower cover are taken out from is used as the guide.

(9) The apparatus for examining an aperture diameter of a disk substrate having a circular aperture in the central portion thereof according to (8), wherein the system that moves the disk substrates back and forth is a system that moves the substrates back and forth without taking out the disk substrates completely from the substrate-storage container.

As described above, according to the present invention, the examination of the aperture diameter of the disk substrate can be completed by fast and simple procedures without damaging the aperture of the disk substrate.

The numerical symbol "11" refers to a disk substrate; the numerical symbol "11*a*" refers to an aperture (inner circumferential surface); the numerical symbol "11*b*" refers to the outer circumferential surface; the numerical symbol "11*c*" refers to a main surface; the numerical symbol "21" refers to an inner circumference grinder; the numerical symbol "31" refers to an outer circumference grinder; the numerical symbol "41" refers to a sphere; the numerical symbol "51" refers to a bar; and the numerical symbol "61" refers to a substrate-storage container.

BEST MODE FOR CARRYING OUT THE INVENTION

Hereinafter, the embodiments of the present invention are described in details with reference to the figures.

Figure 1:
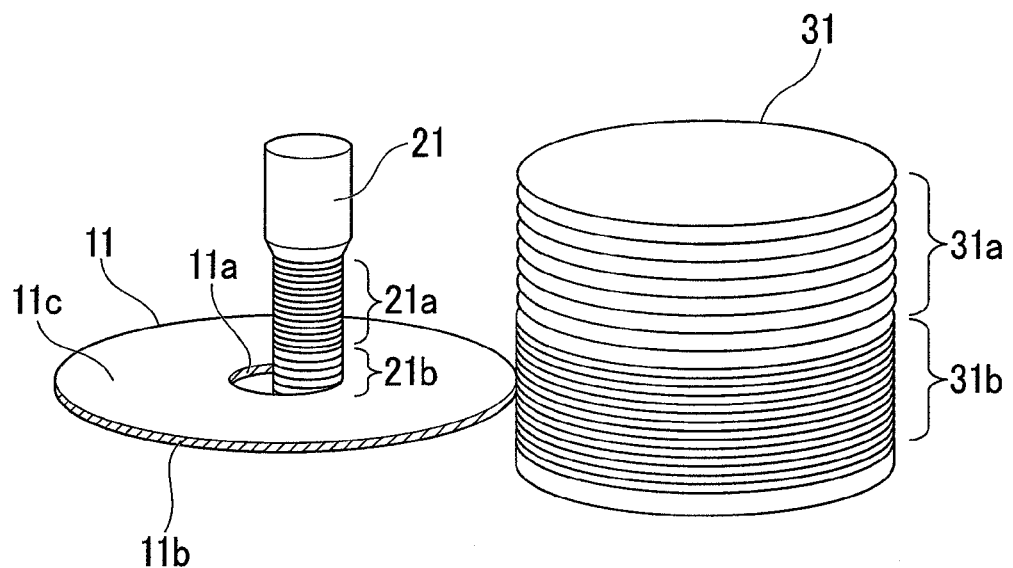
FIG. 1 is a diagram explaining a process of grinding the inner and outer circumference of the disk substrate.

The disk substrate having a circular aperture in the central portion thereof is produced, for example, by grinding the inner and outer circumference, as shown in FIG. 1. Specifically, an aperture (inner circumferential surface) 11*a* that is provided in the center of a disk substrate 11 shown in FIG. 1 is ground with an inner circumference grinder 21 while the disk substrate 11 is rotated on its central axis, and an outer circumferential surface 11*b* of the disk substrate 11 is ground with a outer circumference grinder 31. In this case, the inner circumferential surface and the outer circumferential surface of the disk substrate 11 may be placed between the inner circumference grinder 21 and the outer circumference grinder 31 to simultaneously process the circumferential surfaces. Accordingly, sufficient concentricity of the inner diameter and the outer diameter can be easily obtained. In addition, different types of grooves 21*a* and 21*b* are provided in the outer circumferential surface of the inner circumference grinder 21 while different types of grooves 31*a* and 31*b* are provided in the outer circumferential surface of the outer circumference grinder 31. These grooves correspond to those used for both rough finishing and fine finishing.

Figure 2:
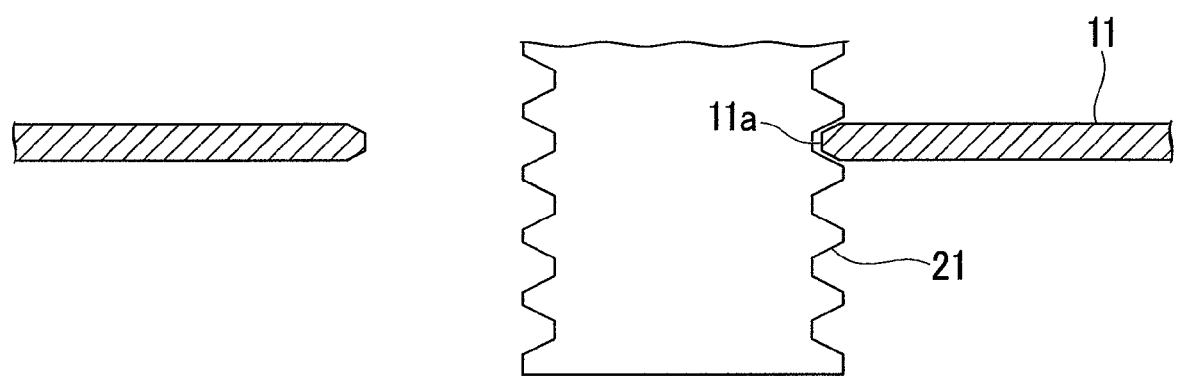
FIG. 2 is an enlarged view of the ground inner circumferential portion of the disk substrate shown in FIG. 1.

The cross-section of the inner circumferential portion of the disk substrate 11 produced by the above-described method becomes the shape shown in FIG. 2. Specifically, the level of roundness of the aperture 11*a* is high because the aperture 11*a* of the disk substrate 11 is processed while rotating the disk substrate 11 and the inner circumference grinder 21. Moreover, the processing of the aperture 11*a* will be very accurate. Furthermore, the shape of the lateral cross section of the aperture 11*a* will be symmetric to the center of the disk substrate 11 when the disk substrate 11 is processed by the above-described method.

Consequently, a main problem to be solved in examining the aperture diameter of the disk substrates 11 having a circular aperture 11*a* in the central portion thereof correlates to how disk substrates whose aperture diameter is slightly smaller than its acceptable limit can be dealt with. Specifically, such substrates cannot be connected to a spindle of a hard disk or the like. Such disk substrates are likely to be produced when the inner circumference grinder 21 is worn out, and therefore, a sufficient grinding rate is not attained in the process of grinding the inner circumference.

In the present invention, an attempt is made to pass a standard sphere for the aperture diameter into the aperture 11a, and the aperture diameter of the disk substrate 11 is inspected based on whether the sphere passes through the aperture in examining the aperture diameter of the disk substrate 11 having a circular aperture 11a in the central portion thereof.

In particular, the examination method according to the present invention can be preferably applied to substrates for magnetic recording media. This is because, as described above, a magnetic recording medium cannot be attached inside a hard disk apparatus if the central aperture of the substrate is even slightly smaller than the diameter of a shaft of a motor, and the influence thereof is not negligible.

Furthermore, the examination method of the present invention can be preferably applied to glass substrates. This is because the inner circumference grinder 21 is easily worn down during grinding the inner circumference, thereby easily causing an error in processing the inner circumferential diameter since the hardness of a glass substrate is high.

In measuring an aperture having a low level of roundness, accurate measurement cannot be achieved unless, for example, image analysis using a CCD camera is applied. However, since the aperture 11a of the disk substrate 11 produced by the above-described production method has a high level of roundness, it is not necessary to adopt such a measurement method.

Figure 3:
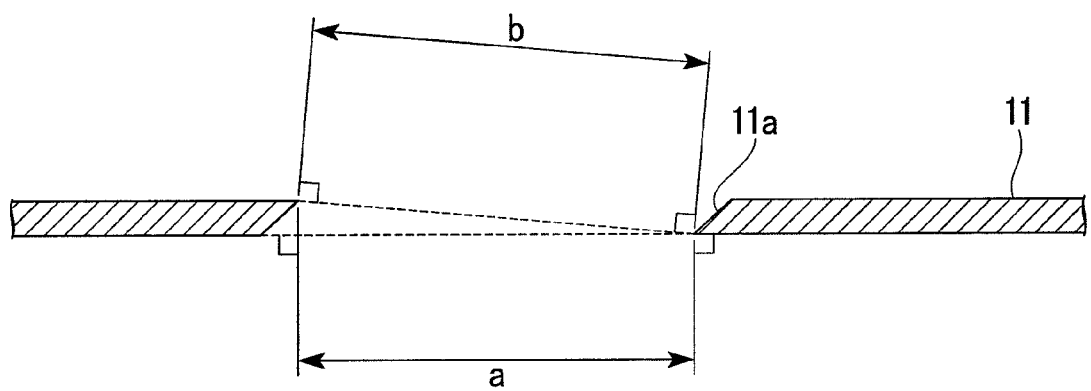
FIG. 3 is a diagram that shows an example where the shape of the lateral cross section is asymmetric to the center of the substrate.

When the shape of the lateral cross section of the aperture 11a is not bilaterally symmetric to the center of the substrate, for example as shown in FIG. 3, even a sphere having diameter "b" slightly lager than an actual aperture diameter "a" may pass through the aperture 11a. On the other hand, it is not necessary to consider measurement errors with respect to aperture diameters "a" and "b", as shown in FIG. 3, in the measurement of the aperture diameter. This is because, with regard to the aperture 11a of the disk substrate 11 produced by the above-described production method, the shape of the lateral cross-section thereof is bilaterally symmetric to the center of the substrate 11. In addition, the processing accuracy of the aperture 11a is very high. Consequently, a main problem to be solved in the measurement of the aperture diameter would be a case where the aperture diameter is slightly smaller than its acceptable limit. That is, this refers to a case where the disk substrate 11 cannot be connected to a spindle of a hard disk or the like.

Accordingly, with regard to the aperture 11a of the disk substrate 11 produced by the above-described production method, it is not necessary to conduct the other measurement of the aperture diameter once it is confirmed that the standard sphere for the aperture diameter is able to pass through the aperture.

It is preferable that, for example, a ceramic ball made from alumina ($Al_2O_3$), silicon carbide (SiC), glass ($SiO_2$) or the like be used as the sphere used in the present invention. Because such a ceramic ball is lighter compared to metals, the disk substrate 11 is hardly damaged when the ceramic ball is passed through the aperture 11a of the disk substrate 11. Furthermore, its hardness is high, and the surface can be highly smoothed. Therefore, such a ceramic ball hardly causes any scratches on the disk substrate 11. Also, the ceramic ball hardly abrades the aperture 11a, thereby preventing wear of the aperture and generation of dusts.

With regard to the size of the sphere used in the present invention, it is preferable that the size be identical to the size of the aperture 11a of the disk substrate 11, which is considered to be a standard for an acceptable product thereof. This is because, if the sphere having such a size can pass through the aperture 11a of the disk substrates, the disk substrates 11 can be undoubtedly connected to a spindle of a hard disk.

Furthermore, the examination method of the present invention preferably adopts the following procedures. That is, in a state that a plurality of the disk substrates 11 is arranged where the main surfaces 11c thereof are spaced out parallel to each other and where the center axes thereof are the same, the attempt is made to pass the sphere 41 from the aperture 11a of the disk substrate 11 at one side to the aperture 11a of the disk substrate 11 at the other side in the arranged direction; and, while removing the disk substrate 11 that the sphere 41 cannot pass through, a plurality of the disk substrates 11 is successively inspected with respect to the aperture diameter, as shown in FIG. 4.

It is possible for the examination method of the present invention to improve the examination efficiency because the method can simultaneously inspect many disk substrates 11 with respect to their aperture diameter. In addition, if a plurality of disk substrates 11 is piled such that each main surface 11c thereof comes into contact with each other, and subjected to the examination, then the main surface 11c, which corresponds to a data-recorded side, will be abraded by another thereby causing scratches thereon. Furthermore, in such a condition, it is difficult to detect and remove disk substrates 11 that the sphere 41 cannot pass through.

With regard to a system for passing the sphere 41 to the aperture, a method in which the central axes of the apertures 11a of the disk substrates 11, which are arranged in a state where each main surface 11c are spaced out parallel to each other, are slightly inclined whereby the sphere 41 rolls down due to the gravity; or a method where the sphere 41 is moved by applying external force thereto can be mentioned. However, in the present invention, it is preferable that the disk substrates 11 be moved back and forth in the direction parallel to the main surfaces 11a of the substrates 11 to achieve the movement of the sphere 41 in the aperture 11a of the disk substrate 11.

Figure 4:
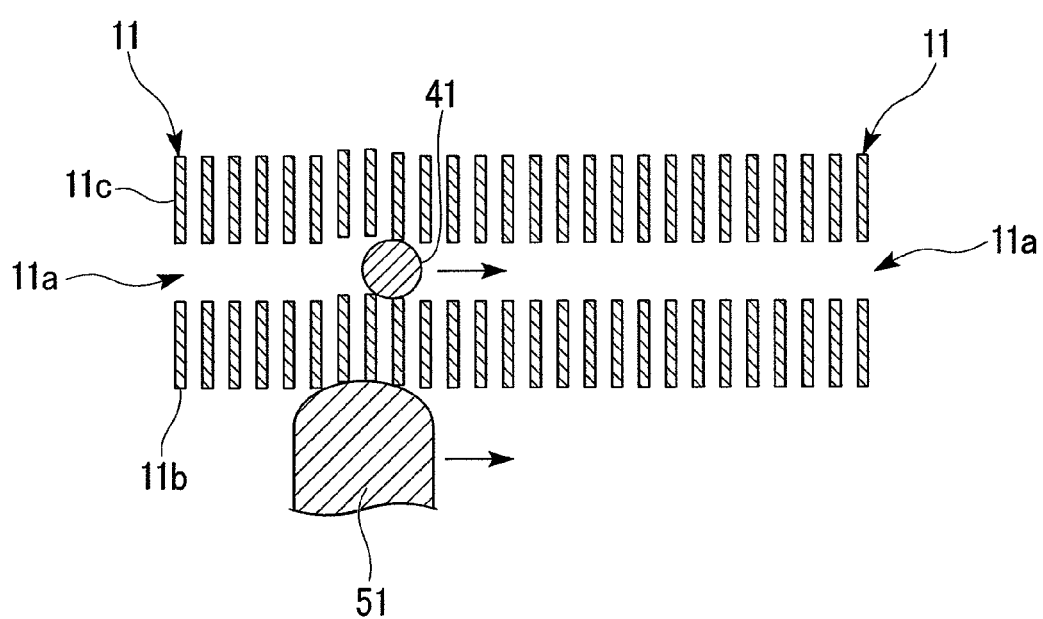
FIG. 4 is a diagram showing the examination method and the examination apparatus of the present invention.

Specifically, such a movement can be achieved by using a hemispherical bar 51 shown in FIG. 4. The tip of the bar 51 is brought into contact with the outer circumferential surface 11b of the disk substrates 11 arranged parallel to each other while the bar 51 is also moved in the direction parallel to the central axes of the disk substrates 11 from one side to the other side in the arranged direction whereby the disk substrates 11 are successively moved back and forth (up and down) in the direction parallel to the main surface 11c of the substrate 11. In this case, the sphere 41 moves to the same direction as the bar 51 moves due to the external force transmitted from the wall surface of the aperture 11a. Then, a plurality of disk substrates 11 is successively inspected with respect to the aperture diameter thereof while removing the disk substrate 11 that the sphere 41 cannot pass through.

By using the above-described method, it is possible to appropriately control the moving speed of the sphere 41. Therefore, the aperture 11a of the disk substrate 11 is not damaged due to the movement of the sphere 41, and the detection and removal of disk substrates 11 that the sphere 41 cannot pass through can be efficiently accomplished.

The examination apparatus used in the examination of the present invention includes: a guide in which a plurality of disk substrates 11 is arranged where the main surfaces 11c thereof are spaced out parallel to each other and where the center axes thereof are the same; a system that successively moves the plurality of the disk substrates 11, which are arranged in the guide, back and forth in the direction parallel to the main surface 11c of the disk substrate 11 from one side to the other side in the arranged direction; a system that attempts to pass a standard sphere 41 for the aperture diameter from the aperture 11a of the disk substrate 11 at one side to the aperture 11a of the disk substrate 11 at the other side in the arranged direction, and that detects the disk substrate 11 which the sphere 41 cannot pass through; and a system that removes from the guide the disk substrate 11 which the sphere 41 cannot pass through. By adopting this configuration, it is possible to prevent scratches to the main surface 11c of the disk substrate 11, and it is also possible to easily remove the disk substrate 11 that the sphere 41 cannot pass through. Accordingly, the aperture diameter of the disk substrate 11 can be efficiently inspected.

Figure 5:
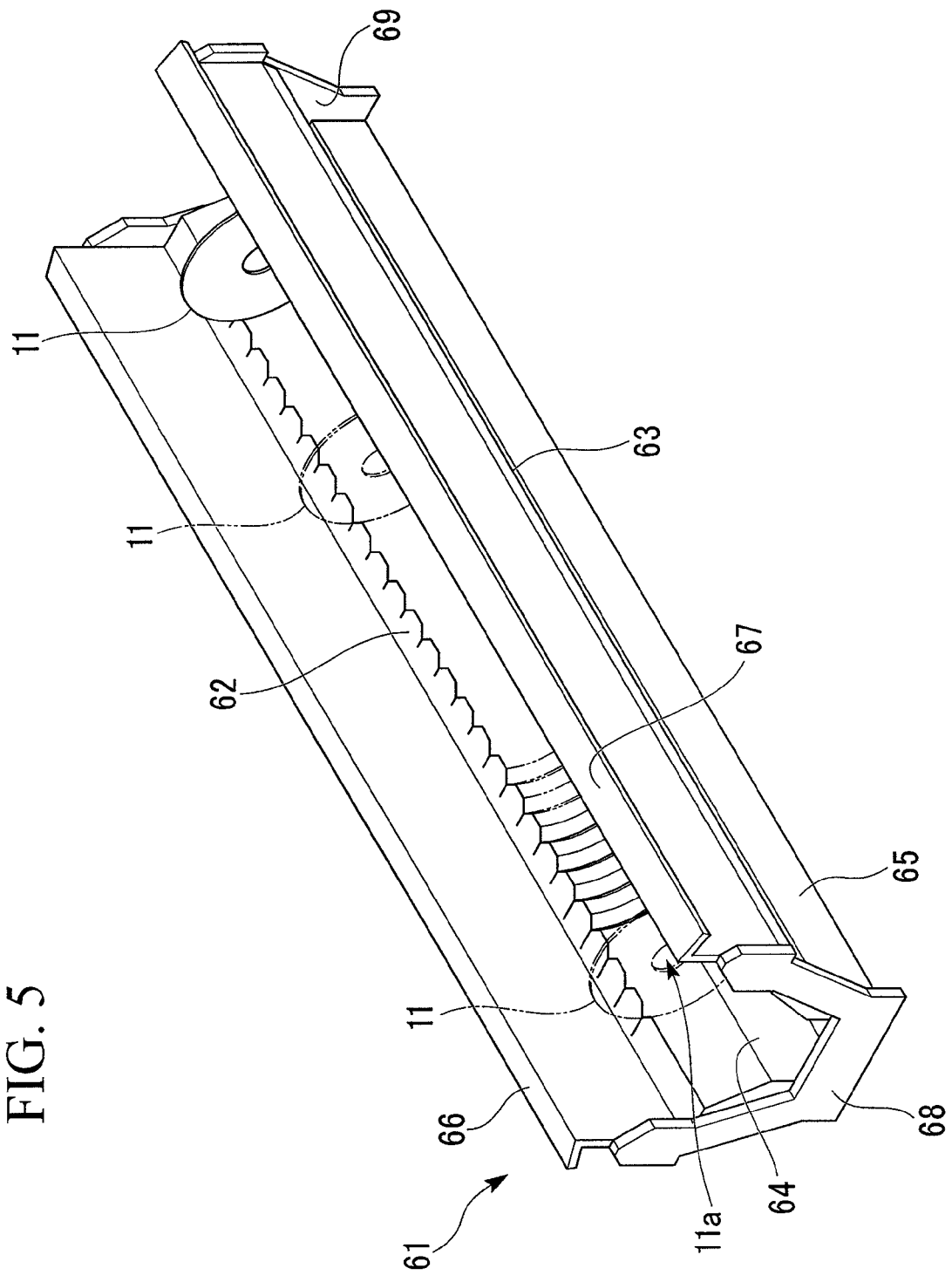
FIG. 5 is a diagram showing an example of the substrate-storage container.

In the present invention, as shown in FIG. 5, it is preferable that the disk substrates 11 be arranged inside a substrate-storage container 61 which an upper cover and a lower cover are taken off from, and that the substrates 11 be moved back and forth in the direction parallel to the main surface 11c of the disk substrate 11 while the disk substrates 11 are not taken out completely from the substrate-storage 61. The substrate-storage container 61 includes four supportive plates 62, 63, 64 and 65 that are strip-shaped; two upper cover guides 66 and 67; and two frame plates 68 and 69 that hold the supportive plates 62 to 65 and the upper cover guides 66 and 67.

In general, the substrate-storage container has a structure including upper and lower covers whereby substrates can be easily taken out from the container. Accordingly, in the substrate-storage container 61 of the present invention, the disk substrates 11 can be subjected to the examination method of the present invention by only removing the upper and lower covers, thereby simplifying the examination steps. Furthermore, the examination method of the present invention can be accomplished without taking out the substrate 11 completely from the substrate-storage container 61. Therefore, the examined disk substrates 11 can be sent to the next step while they are still installed in the substrate-storage container 61 with the upper and lower covers attached.

As described above, according to the present invention, not only can one hundred percent inspection be achieved in a short time using the easy and simple method with respect to the aperture diameter of the disk substrate 11 having a circular aperture 11a in the central portion thereof, but the examination can be also completed without damaging disk substrates 11.

Examples

Hereinafter, the effects of the present invention will be demonstrated by using an example. In addition, the present invention is not limited to the example, and additions, omissions, substitutions, and other modifications can be made without departing from the spirit or scope of the present invention.

Example

In the example, as a disk substrate subjected to the examination, a crystallized glass for a magnetic recording medium, manufactured by KMG Corporation was used. The size of the disk substrate was 48.0 mm in outer diameter, 12.0 mm in inner diameter, and 0.508 mm in board thickness. The twenty-five substrates were set parallel to each main surface at 6 mm intervals in a substrate-storage container. Additionally, upper and lower covers were taken out from the substrate-storage container.

Then, an alumina ball whose outer diameter was 12.0 mm was inserted into the aperture of the disk substrate that was set at one side in the substrate-storage container, and the alumina ball was moved by moving the disk substrates up and down by 5 mm in the vertical direction, successively from one side to the other side. The moving speed of the up and down movement of the disk substrate in the arranged direction was 0.2 second/disk.

Ten thousand disk substrates were inspected using this method with respect to their aperture diameter. As a result, three unacceptable articles thereof were inspected. With regard to the time required for the examination, an inspection period required for the movement of the alumina ball was about 35 minutes, a period required for exchanging the storage-substrate container was about 15 minutes, and a period for removing the rejected articles was about 1 minute. That is, it took about 51 minutes to complete the examination.

Comparative Example

In the comparative example, disk substrates having the same shape as in the example were inspected with respect to their aperture diameter using a conventional inner diameter examination apparatus manufactured by Mitutoyo Corporation.

In this method, the inspection period was about 10 seconds per substrate, and it required about 28 hours to inspect ten thousand disk substrates.

As demonstrated above, according to the present invention, the examination can be completed with respect to aperture diameter of disk substrates by a fast and easy method without damaging the aperture of the disk substrates.

The invention claimed is:

1. A method of examining an aperture diameter of a disk substrate having a circular aperture in the central portion thereof, the method comprising:
    attempting to pass a standard sphere for the aperture diameter through the aperture; and
    inspecting the aperture diameter of the disk substrate, based on whether the sphere passes through the aperture or not;
    wherein a plurality of the disk substrates is arranged where the main surfaces of the disk substrates are spaced out parallel to each other and where the center axes of the disk substrates are the same,
    the step of attempting to pass the standards sphere comprises attempting to pass the sphere from the aperture of the disk substrate at one side to the aperture of the disk substrate at the other side; and
    successively inspecting a plurality of the disk substrates with respect to the aperture diameter and removing during the inspection any disk substrate that the sphere cannot pass through.

2. The method of examining an aperture diameter of a disk substrate having a circular aperture in the central portion thereof according to claim 1, wherein the substrates are moved back and forth in the direction parallel to the main surface of the disk substrate to conduct the movement of the sphere through the aperture of the disk substrate.

3. The method of examining an aperture diameter of a disk substrate having a circular aperture in the central portion thereof according to claim 2, wherein the disk substrates are disposed in a substrate-storage container which an upper cover and a lower cover are taken out from, and the substrates are moved back and forth in the direction parallel to the main surface of the disk substrate while the disk substrates are not taken out completely from the substrate-storage container.

4. The method of examining an aperture diameter of a disk substrate having a circular aperture in the central portion thereof according to claim 1, wherein at least one of the plurality of disk substrates is a substrate for a magnetic recording medium.

5. The method of examining an aperture diameter of a disk substrate having a circular aperture in the central portion thereof according to claim 1, wherein at least one of the plurality of disk substrates is a glass substrate.

* * * * *